United States Patent
Szewczyk et al.

Patent Number: 5,228,649
Date of Patent: Jul. 20, 1993

[54] STOPCOCK

[75] Inventors: Mattias Szewczyk; Friedrich-Karl Benra, both of Witten, Fed. Rep. of Germany

[73] Assignee: Paul Pleiger Maschinenfabrik GmbH & Co KG, Witten, Fed. Rep. of Germany

[21] Appl. No.: 734,256

[22] Filed: Jul. 22, 1991

[30] Foreign Application Priority Data

Jul. 27, 1990 [DE] Fed. Rep. of Germany ... 9011113[U]

[51] Int. Cl.⁵ .................... F16K 5/00; F16C 19/10
[52] U.S. Cl. ............................ 251/309; 384/605
[58] Field of Search ............. 251/309; 384/605, 493, 384/517, 518

[56] References Cited

U.S. PATENT DOCUMENTS

| | | | |
|---|---|---|---|
| 2,398,444 | 4/1946 | Nordstrom | 251/112 |
| 2,524,104 | 10/1950 | Graham | 251/113 |
| 2,727,796 | 12/1955 | Sardou, Jr. | 384/493 |
| 3,252,684 | 5/1966 | Ksieski | 251/309 |
| 3,429,224 | 2/1969 | Osburn | 384/493 X |
| 3,807,815 | 4/1974 | Kasabian | 384/517 X |
| 4,180,244 | 12/1979 | Rosenitsch | 251/309 |
| 4,363,527 | 12/1982 | Thrasher | 384/517 X |
| 4,551,032 | 11/1985 | Mottershead | 384/517 |
| 4,913,564 | 4/1990 | Stephen et al. | 384/518 |

Primary Examiner—Martin P. Schwadron
Assistant Examiner—Kevin L. Lee
Attorney, Agent, or Firm—Ladas & Parry

[57] ABSTRACT

A stopcock, in particular for burner fittings, having a housing and a truncated-cone-shaped plug rotatably inserted therein, a spindle of the plug extending through a fixed retaining disk and being provided with a setting nut by means of which a bearing is held between retaining disk and plug, wherein one bearing each is provided on either side of the retaining disk, and the retaining disk or a part of the same is attached to the housing in such a way that it can be set relative to the housing in the axial direction.

7 Claims, 3 Drawing Sheets

PRIOR ART

STOPCOCK

The invention relates to a stopcock according to the preamble of claim 1. Stopcocks of this type are used in burner fittings for coking plants and they serve as a closure for waste and by-product coke-oven gas or pipelines carrying combustion air.

FIG. 1 shows a longitudinal section through a known stopcock having a housing 1, which can be inserted between two pipelines (not shown), and a truncated-cone-shaped plug 2 which is rotatably inserted therein and whose spindle 3, on the side having a smaller plug diameter, extends through a retaining disk 4 which is secured to the housing 1 by a housing cover 5 fastened by screws. On the outside of the retaining disk 4, a deep-groove ballbearing or an axial bearing 6 is inserted into a step of the center bore, against the outer race of which deep-groove ballbearing or axial bearing 6 a setting nut 7 bears which is screwed onto the spindle 3 of the plug 2 and is secured by a lock nut.

The gap between plug 2 and housing 1 is established by the setting nut 7, but the plug in FIG. 1 can be displaced downward relative to the housing 1 if the housing expands due to heating, so that the plug jams in the housing. A stopcock according to FIG. 1 can therefore only be used for temperatures up to a maximum of 40° C.

The object of the invention is to design a stopcock of the type specified at the beginning in such a way that it can also be used for higher temperatures without the plug jamming in the housing.

This object is achieved according to the invention by the features discussed below. By one bearing each on either side of the retaining disk, the plug is fixed in the housing in such a way that it is stationary relative to the housing and cannot plunge further into the housing, while the requisite gap between plug and housing can be established by the adjustability of the bearings on the retaining disk. Thus a stopcock of this type can also readily be used at higher temperatures, since jamming due to temperature-induced expansion of the housing is eliminated by securing the plug relative to the housing.

Further advantages of the invention are specified in the following description and in the further claims.

The invention is explained in more detail below with reference to the drawing, in which.

The same reference numerals as used in FIG. 1 are used in FIG. 2 for the same or corresponding components.

Figure 1:
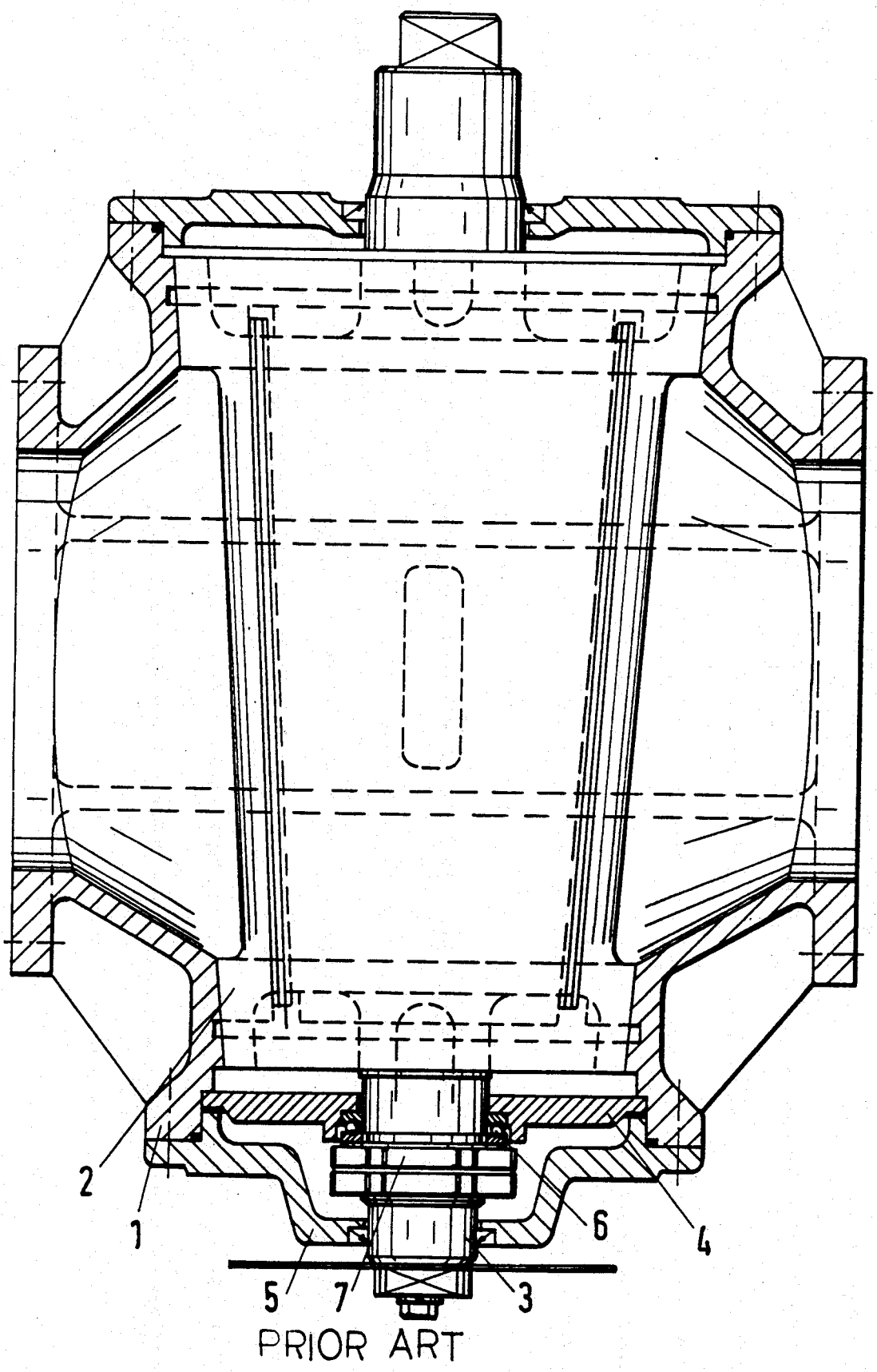
FIG. 1 shows a longitudinal section through a known stopcock.

The retaining disk 4 is directly secured to the housing 1 by means of screws 8 accessible from the outside, while the housing cover 5 is fastened to the retaining disk 4 by means of screws 9. Screwed into the retaining disk 4 is a regulating sleeve 10 through which the spindle 3 of the plug 2 extends to the outside while forming an annular gap. A deep-groove ballbearing 11 rests on the inside on a step of the regulating sleeve 10 projecting radially to the inside, the inner race of which deep-groove ballbearing 11 rests directly against the plug 2, while the outer race rests against the regulating sleeve 10 with clearance relative to the spindle 3. On the opposite outer side of the step on the regulating sleeve 10, a further deep-groove ball-bearing 12 is arranged in such a way that the inner race resting against the regulating sleeve 10 has clearance relative to the spindle 3 of the plug, while the outer race is mounted on the spindle 3 of the plug. The outer deep-groove ballbearing 12 is held in contact with the regulating sleeve 10 by a setting nut 7 screwed onto the spindle 3, a Belleville spring washer 13 and an intermediate ring 14 being arranged between setting nut 7 and bearing 12 in the exemplary embodiment shown according to FIG. 2.

The clearance required between plug 2 and housing 1 is set by the regulating sleeve 10 first of all being appropriately set relative to the fixed retaining disk 4, the inner bearing 11 being fixed accordingly, whereupon the outer bearing 12 is secured to the regulating sleeve 10 by the setting nut 7. The regulating sleeve 10 is secured to the retaining disk 4 by a threaded ring 15 screwed onto the outer periphery of the regulating sleeve 10, the threaded ring 15 being secured to the retaining disk 4 by a headless set screw 16. An axial bore 17 or an appropriate recess for the engagement of an adjusting tool is made on the outer end face of the regulating sleeve 10. The setting nut 7 is secured against turning relative to the spindle 3 by a headless set screw 18, by means of which the thread engagement is restrained via a slot in the peripheral direction of the setting nut 7.

After the two bearings 11, 12 are set, the plug 2 is fixed in the housing 1 in such a way that the plug cannot plunge deeper into the housing and thus jam. The plug is secured by the setting nut 7 against movement to the right in FIG. 2 or to the top in FIG. 1 relative to the housing 1, while movement of the plug 2 to the left in FIG. 2 or to the bottom in FIG. 1 is prevented by the regulating sleeve 10 and the inner bearing 11.

Figure 2:
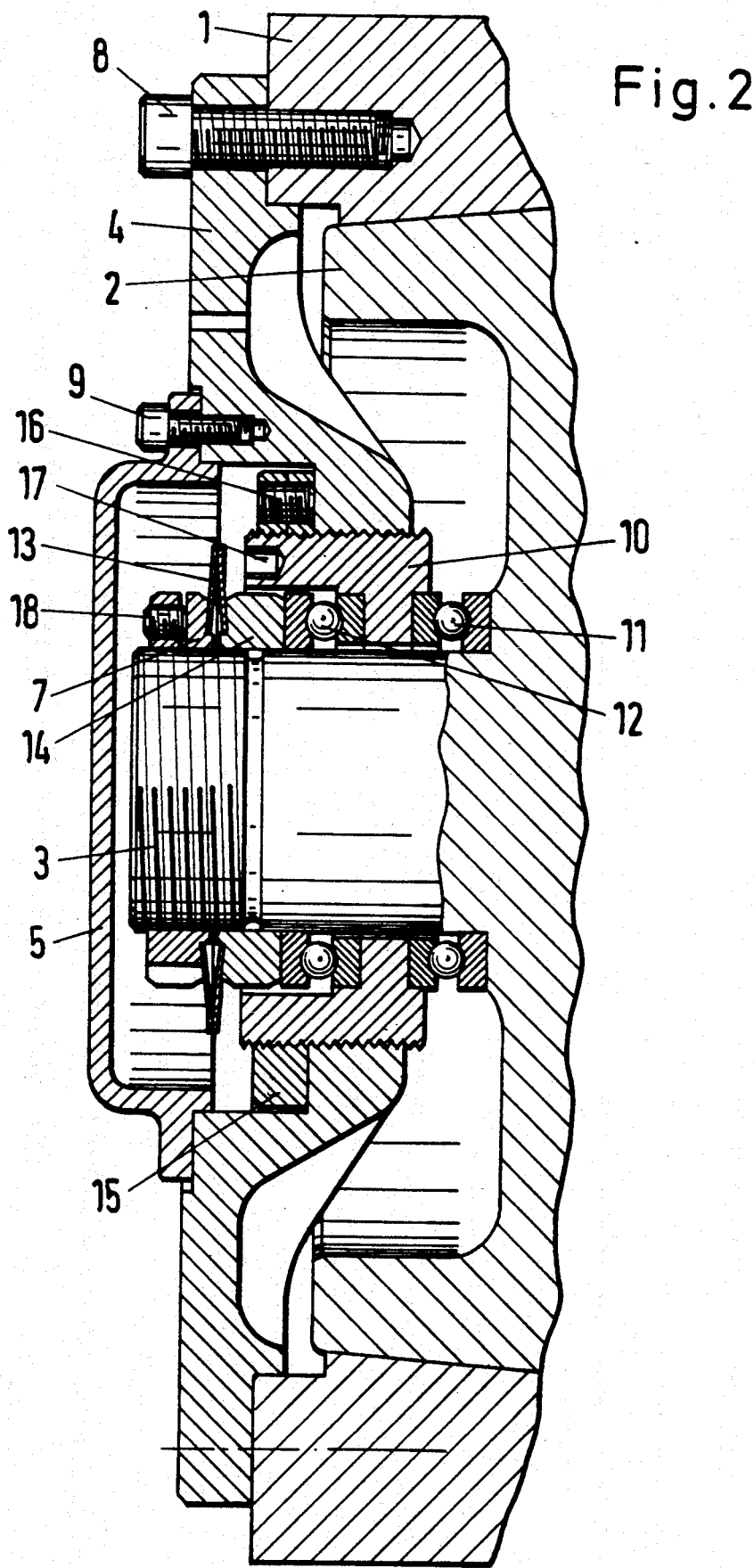
FIG. 2 shows a partial section through a stopcock according to the invention.

In the exemplary embodiment shown according to FIG. 2, movement of the plug to the right in FIG. 2 is made possible by the Belleville spring washer 13 and a predetermined axial distance between setting nut 7 and intermediate ring 14. The Belleville spring washer 13 can also be omitted at this location. It can also be provided on the opposite side of the plug 2 between the same and the housing or a housing cover.

Due to the plug setting described, the plug, even during heating through higher temperatures, is firmly fixed despite expansion of the housing, and the set clearance between housing and plug remains defined so that no difficulties arise even at higher temperatures.

Various modifications of the type of construction described are possible. Thus the regulating sleeve 10, for example, can be omitted so that the two bearings 11, 12 rest directly against a step of the retaining disk 4, while the retaining disk 4 itself can be adjusted relative to the housing 1 via a threaded section on the outer periphery. In this case, the housing cover 5 would be of larger design and would overlap the retaining disk 4, as is also the case in the type of construction according to FIG. 1.

Figure 3:
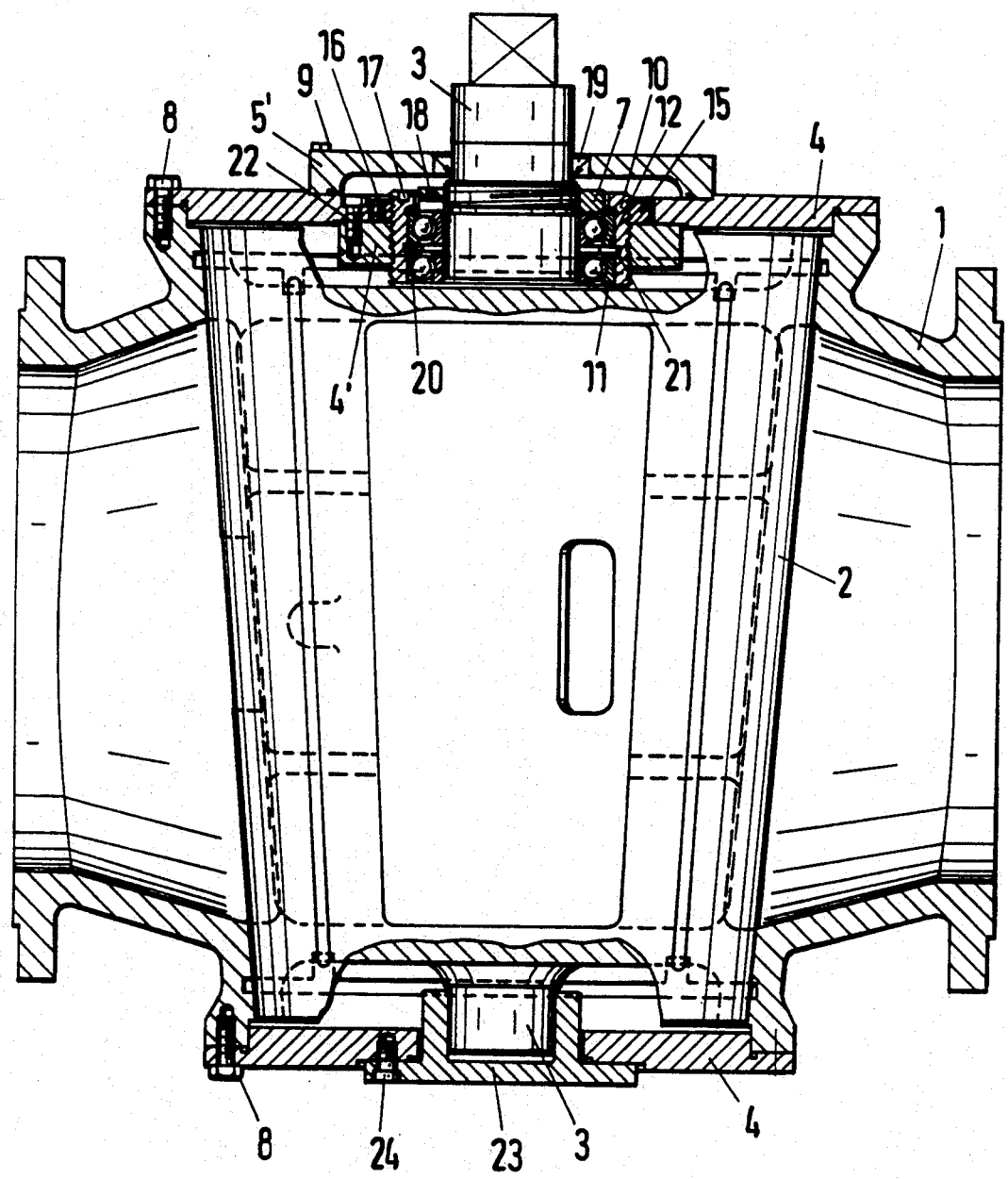
FIG. 3 shows a sectional view of a modified embodiment according to the invention.

The embodiment according to FIG. 2 is provided at the bottom end of the plug 2 as in the representation according to FIG. 1. FIG. 3 shows the arrangement according to the invention on the top side of the plug 2 or on the side of the plug having the larger diameter, in which arrangement the same reference numerals are used in FIG. 2 are used in FIG. 3 for the same or corresponding components.

In FIG. 3, the bottom end of the spindle 3 is rotatably inserted in a bearing bush 23 which is firmly connected to the retaining disk 4 via a flange and screws 24 attached thereto. At the top side, the top end of the spindle 3 extends through the retaining disk 4, which in this exemplary embodiment is firmly connected to a ring 4' by means of screws 22. The ring 4' forms a part of the retaining disk 4 and is provided with a thread on the inner periphery, with which thread the thread on the outer periphery of the regulating sleeve 10 meshes, which regulating sleeve 10 is secured in its position relative to the retaining disk 4 by the threaded ring 15. On the inner periphery, the regulating sleeve 10 is provided with an annular groove 21 in which a spring ring 20 is inserted, on both sides of which the bearings 11 and 12 rest, which in this exemplary embodiment are designed as radial ballbearings whose outer race in each case rests against the spring ring 20, while the inner race rests on the spindle 3 of the plug 2. The spring ring 20 in FIG. 3 corresponds to the annular shoulder on the inner periphery of the regulating sleeve 10 according to FIG. 2.

In the embodiment according to FIG. 3, the setting nut 7 rests directly against the inner race of the outer bearing 12 so that the intermediate ring 14 having Belleville spring washer 13 according to FIG. 2 is omitted.

The housing cover 5' in FIG. 3 is provided with a sealing ring 19 which rests on the periphery of the spindle 3.

We claim:

1. A stopcock comprising:
   a housing having end portions;
   a retaining disk fixed to at least one end portion, said retaining disk having an aperture defined therein;
   a regulating sleeve positioned within the aperture and connectable to said retaining disk by a connecting means so that the sleeve is axially moveable along the longitudinal axis of the stopcock, said sleeve being provided with an annular shoulder on an inner periphery thereof;
   a rotatable tapered member within the housing having a spindle extending therefrom, one end of the spindle extending within said sleeve;
   a first set of ball bearings positioned between the annular shoulder of the sleeve and the tapered member;
   a second set of ball bearings positioned between the annular shoulder of the sleeve and the spindle, said second set of ball bearings being held in contact with the sleeve by a setting nut attached to the spindle; and
   locking means connectable to the sleeve and the retaining disk to lock the sleeve to the retaining disk and prevent the sleeve from being axially moveable.

2. The stopcock as claimed in claim 1, wherein the connecting means comprises intermeshing teeth on said retaining disk and said regulating sleeve.

3. The stopcock as claimed in claim 2, wherein a spring is arranged between the setting nut and the second set of ball bearings.

4. The stopcock as claimed in claimed in claim 2, wherein the the locking means is a threaded ring mounted onto the sleeve and attached to the retained disk by at least one screw.

5. The stopcock as claimed in claim 2, wherein the regulating sleeve is provided with a recesses on an outer end face for engagement by an adjusting tool to adjust the axial position of the sleeve.

6. The stopcock as claimed in claim 1, wherein a housing cover is fastened to the retaining disk by means of screws and covers the regulating sleeve.

7. The stopcock as claimed in claim 1, wherein an other end of the spindle is positioned within a bearing bush.

* * * * *